United States Patent
Suzuki

(10) Patent No.: US 6,551,213 B2
(45) Date of Patent: Apr. 22, 2003

(54) CONTROL APPARATUS OF VEHICULAR AUTOMATED MANUAL TRANSMISSION

(75) Inventor: Hosei Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/986,423

(22) Filed: Nov. 8, 2001

(65) Prior Publication Data

US 2002/0055412 A1 May 9, 2002

(30) Foreign Application Priority Data

Nov. 9, 2000  (JP) ........................................ 2000-341777

(51) Int. Cl.[7] .............................................. B60K 41/04
(52) U.S. Cl. ........................................ 477/111; 477/109
(58) Field of Search ................................ 477/107, 111, 477/113, 97, 109

(56) References Cited

U.S. PATENT DOCUMENTS

| | | | | | |
|---|---|---|---|---|---|
| 3,666,062 | A | * | 5/1972 | Riese ....................... | 192/70.28 |
| 4,493,228 | A | * | 1/1985 | Vukovich et al. ........ | 477/111 X |
| 4,544,057 | A | * | 10/1985 | Webster et al. ............... | 477/86 |
| 5,441,464 | A | * | 8/1995 | Markyvech ............. | 477/111 X |
| 5,583,766 | A | * | 12/1996 | Birchenough et al. ...... | 364/424 |
| 5,772,554 | A | * | 6/1998 | Tabata .......................... | 477/109 |
| 5,863,275 | A | * | 1/1999 | Nozaki et al. ............... | 477/110 |
| 5,997,435 | A | * | 12/1999 | Back ....................... | 477/110 X |
| 6,007,455 | A | * | 12/1999 | Steeby .................... | 477/111 X |

FOREIGN PATENT DOCUMENTS

JP           2873690           1/1999

* cited by examiner

Primary Examiner—Richard M. Lorence
Assistant Examiner—Roger Pang
(74) Attorney, Agent, or Firm—McGinn & Gibb, PLLC

(57) ABSTRACT

A control apparatus of a vehicular automated manual transmission includes an input shaft provided with a plurality of drive gears, and an output shaft provided with a plurality of driven gears engaging with the drive gears, in which the drive gears and the driven gears form a plurality of transmission gear trains through engaging with each other. When down-shifting among the transmission gear trains, an engine speed Ne is set higher by a predetermined value $\alpha$ than an input shaft rotational speed Nm. Thereby, the drag torque of the wet clutch works in such a manner that the input shaft rotational speed is increased, so that the difference of rotational speed between the input shaft and the output shaft becomes small. Accordingly, a transmission characteristic of the vehicular automated manual transmission with wet multi-disc type clutch can be improved.

3 Claims, 4 Drawing Sheets

(A1)

(B1)

(A2)

(B2)

(A3)

(B3)

(A4)

(B4)

CONTROL APPARATUS OF VEHICULAR AUTOMATED MANUAL TRANSMISSION

BACKGROUND OF THE INVENTION

The present invention relates to a control apparatus of an automated manual transmission mounted on a motor vehicle or the like, and more particularly to the apparatus effectively applied to an automated manual transmission having a plurality of transmission gear trains.

A manual type transmission executing a shift change operation by a manual operation of a driver includes an input shaft engaged to an engine and to which a plurality of drive gears are attached, and an output shaft engaged to drive wheels and to which a plurality of driven gears forming pairs together with the drive gears are attached, in which a plurality of transmission gear trains are provided between the input shaft and the output shaft. In this manual type transmission, a gear change operation, i.e., a shift change is performed by manually switching a switching mechanism such as a synchromesh mechanism for switching a transmission gear train performing a power transmission, namely, a gear pair among a plurality of transmission gear trains after disengaging a clutch at a time of changing gear, thereafter engaging the clutch.

When automatically executing the shift change and the clutch operation by a hydraulic actuator, it is possible to obtain an automated manual transmission based on a structure of a manual type transmission. This automated manual transmission has an advantage that the number of the parts can be reduced in comparison with a normal torque converter type automatic transmission having a planetary gear or the like in an automatic shift change mechanism to easily lighten the transmission, and a further advantage that a transmission efficiency of a drive system is higher than that of the automatic transmission.

The automated manual transmission is provided with a main clutch positioned between a crank shaft and the input shaft in order to switch between an engaged state and a disengaged state. As the main clutch, a wet clutch may be employed which is superior to a dry clutch in durability and controlling characteristic. The wet clutch performs a connection and disconnection of power due to pressing a drive side clutch disc fixed to the crank shaft against a driven side clutch disc fixed to the input shaft or not.

However, there occurs a drag torque due to fluid friction of lubricating oil while disengaging the clutch since the lubricating oil is filled between the drive side clutch disc and the driven side clutch disc. Therefore, a rotational speed of the input shaft at a time of down-shifting of the automated manual transmission with the wet clutch results in extremely falling due to the drag torque of the wet clutch when turning a throttle valve of the engine down at the same time as disengaging the wet clutch at the time of down-shifting. Thereby, the difference of the rotational speed between the input shaft and the output shaft becomes large, so that a load applied to a synchromesh mechanism becomes excessive. As a result, there occur problems that shift changing time may be extended, or the synchromesh mechanism may be damaged. In particular, such a tendency is strong at a low temperature oil since viscosity of the lubricating oil becomes large.

In order to improve these disadvantages, for example, the Japanese Patent No. 2873690 discloses a structure that a lubricating circuit of the wet clutch is provided with a valve to discharge the lubricating oil within the wet clutch at a time of shift change. Indeed, discharge of the lubricating oil results in reducing the drag torque, but complicated lubricating paths are needed for doing so, so that there may occur any further problem in an aspect of space or cost.

SUMMARY OF THE INVENTION

An object of the present invention is to improve a transmission characteristic of a vehicular automated manual transmission provided with a wet clutch.

In accordance with the present invention, there is provided a control apparatus of a vehicular automated manual transmission having an input shaft provided with a plurality of drive gears, an output shaft provided with a plurality of driven gears engaging with the drive gears, and a hydraulic actuator for switching a transmission gear trains transmitting a power from the input shaft to the output shaft, comprising an electronic control throttle valve for adjusting an engine speed, a wet clutch for engaging/disengaging an engine with the input shaft, the wet clutch being provided between the engine and the input shaft, and control means for setting the engine speed higher by a predetermined value than a rotational speed of the input shaft through allowing the electronic control throttle valve to open when down-shifting the transmission gear trains by the actuator.

It is a further characteristic of the present invention that the control means adjusts an opening degree of the throttle valve based on signals detected from an engine speed sensor, an input shaft rotational speed sensor, and a lubricating oil temperature sensor.

In addition, it is the other characteristic of the present invention that the predetermined value is set small as an oil temperature of a lubricating oil filled in the wet clutch becomes low.

According to the present invention, a transmission characteristic of the vehicular automated manual transmission with the wet clutch can be improved, in particular, during down-shifting. In more detail, since the engine speed is set higher by the predetermined value than the input shaft rotational speed, in which the drag torque of the wet clutch works in such a manner that the rotation of the input shaft is increased, the difference of the rotational speed between the input shaft and output shaft becomes small, so that the transmission operation of down-shifting can be quickly executed. In addition, it is possible to reduce the degree of shock which occurs when the wet clutch is engaged again after terminating the down-shifting operation. Further, the load applied to the synchromesh mechanism can be reduced, so that it is possible to prevent the synchromesh mechanism from being damaged due to the load.

Also, since the added predetermined value is set in accordance with the lubricating oil temperature, the viscosity of the lubricating oil, i.e., force of drag torque thereof can be considered in the transmission control of the present invention.

BRIEF DESCRIPTION OF THE DRAWINGS

These and other objects and advantages of the present invention will become understood from the following description with reference to the accompanying drawings, wherein.

DETAILED DESCRIPTION OF THE PREFERRED EMBODIMENT

Figure 1:
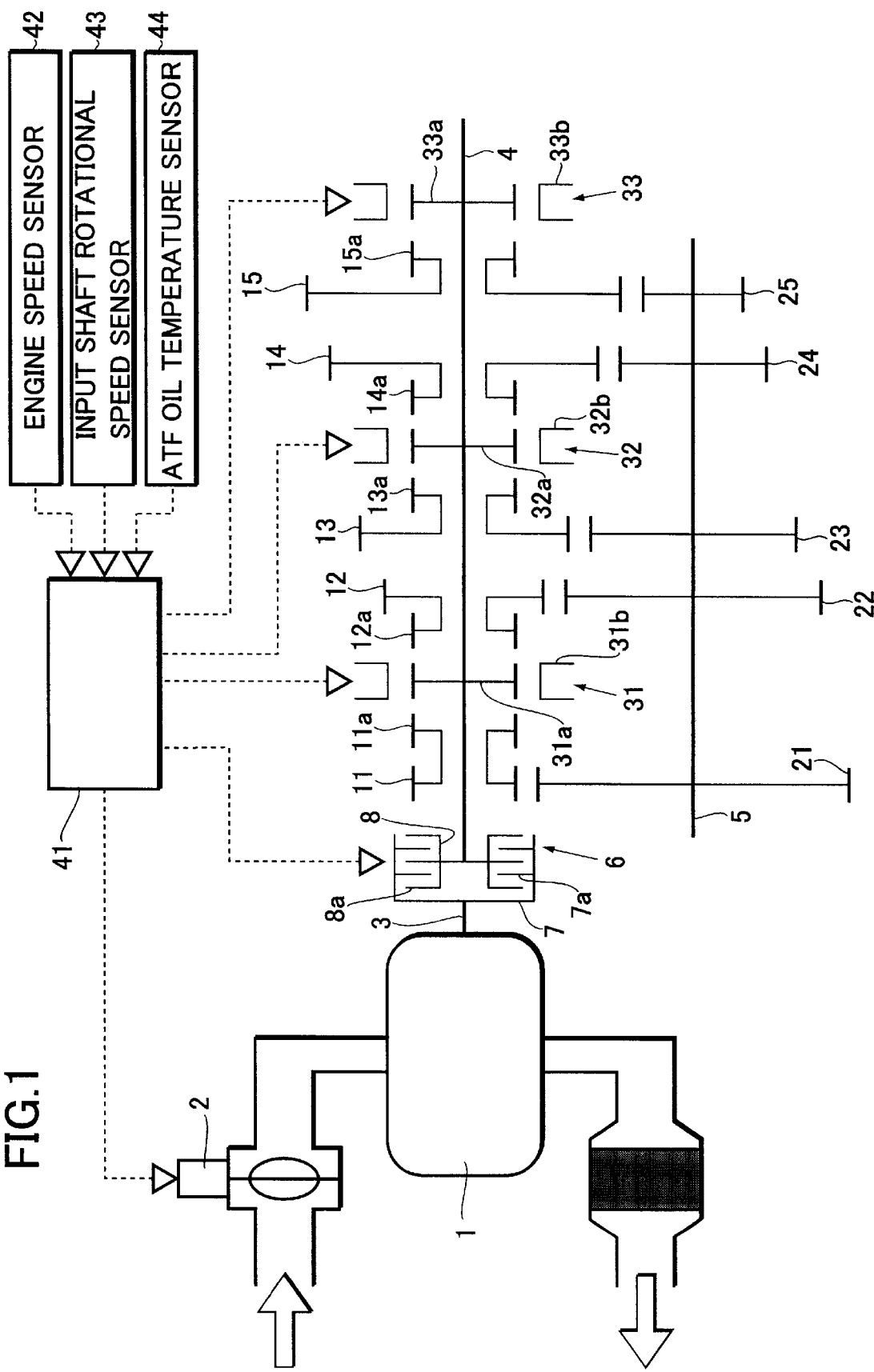
FIG. 1 is a skeleton view showing a vehicular automated manual transmission in accordance with an embodiment of the present invention.

An embodiment according to the present invention will be explained in detail hereinafter with reference to the accompanying drawings. FIG. 1 is a skeleton view showing a vehicular automated manual transmission as an embodiment of the present invention.

An engine 1 as shown in FIG. 1 is provided with an electronic control throttle valve 2 for adjusting an engine torque and an engine speed, and normally an engine control is executed by opening and closing the electronic control throttle valve 2 based on an output signal from an electronic control unit according to a depressing amount of an accelerator pedal (not shown). Further, the electronic control throttle valve 2 can also be opened and closed in accordance with a detected operating condition on the basis of a map previously set, without relation to the depressing amount of the accelerator pedal as mentioned above, thereby executing an engine control.

Further, a vehicular automated manual transmission for transmitting a power generated by the engine 1 to drive wheels includes an input shaft 4 engaged to a crank shaft 3 of the engine 1, and an output shaft 5 arranged in parallel to the input shaft 4 and engaged to the drive wheels. A wet clutch 6 controlled by an actuator (not shown) is provided as an input clutch, namely, a main clutch provided between the crank shaft 3 of the engine 1 and the input shaft 4 so as to automatically engage or disengage the crank shaft 3 of the engine 1 with the input shaft 4. The wet clutch 6 includes a plurality of drive side clutch discs 7a mounted on a clutch drum 7 fixed to the crank shaft 3, and a plurality of driven side clutch discs 8a mounted on a clutch hub 8 fixed to the input shaft 4. When the drive side clutch discs 7a and the driven side clutch discs 8a are pressed against each other, the engine 1 is engaged to the input shaft 4. On the other hand, when the both discs are separated during a transmission operation, the engine 1 is disengaged from the input shaft 4. Automatic transmission fluid (hereinafter, simply refer to ATF) is filled as lubricating oil within the wet clutch 6, fluid friction and cooling effect of which improves a control characteristic and durability of the transmission.

Drive gears 11–15 corresponding with the first gear range to the fifth gear range are rotatably attached to the input shaft 4, and also driven gears 21–25 corresponding with the first gear range to the fifth gear range are fixed to the output shaft 5. Each drive gear 11–15 is meshed with the corresponding driven gear 21–25 to form a transmission gear train, which is switched for transmitting a power so as to execute a shift operation.

A first synchromesh mechanism 31 is provided as a switching mechanism between the first speed drive gear 11 and the second speed drive gear 12 at the input shaft 4. A second synchromesh mechanism 32 is provided between the third speed drive gear 13 and the fourth speed drive gear 14, and a third synchromesh mechanism 33 is provided adjacent to the fifth speed drive gear 15 at the input shaft 4. Reverse gears (not shown) are mounted on the input shaft 4 and the output shaft 5. The both reverse gears are meshed each other via an idler gear (not shown), so that a reverse rotation of the input shaft 4 is transmitted to the output shaft 5.

The synchromesh mechanism 31 includes a synchronous hub 31a fixed to the input shaft 4 and a synchronous sleeve 31b always engaging therewith. When engaging the synchronous sleeve 31b with a spline 11a integrally formed in the first speed drive gear 11, a transmission gear ratio is set to one of a first speed range, and to the contrary, when engaging with a spline 12a integrally formed in the second speed drive gear 12, it is set to a second speed range. The other synchromesh mechanisms 32 and 33 include synchronous hubs 32a and 33a fixed to the input shaft 4 and synchronous sleeves 32b and 33b always engaging with them, respectively, as well as the synchromesh mechanism 31, and are respectively engaged with any of the corresponding spline 13a, 14a and 15a, whereby each transmission gear ratio is set to one of a third speed range to a fifth speed range. Moreover, a sift change operation due to an engaging movement of respective synchronous sleeve 31b, 32b, and 33b in an axial direction is automatically executed by an actuator (not shown).

On the other hand, each operation of the electronic control throttle valve 2, the wet clutch 6, and shift change in the vehicular automated manual transmission of the present invention is automatically executed by the actuators, each operation of which is controlled by a control unit 41 as control means. Signals from an engine speed sensor 42, an input shaft rotational speed sensor 43, and an ATF oil temperature sensor 44 are fed to the control unit 41. Thereby, the control unit 41 determines a driving condition of the motor vehicle based on information such as an engine speed Ne detected by the engine speed sensor 42, an input shaft speed Nm detected by the input shaft speed sensor 43, and ATF oil temperature detected by the ATF oil temperature sensor 44, and then controls the operation of each actuator on the basis of a preset map, so that the transmission operation can be automatically executed.

Next, the transmission operation of the vehicular automated manual transmission in FIG. 1 will be explained. First, assume that a neutral range is selected through a driver's operation of a select lever mounted in a passenger's compartment under the engine driving condition, in which the wet clutch 6 is held with a disengaging state between the engine 1 and the input shaft 4 by means of the actuator controlled by the control unit 41.

When selecting a forward moving stage by means of the select lever, the control unit 41 controls the actuator so as to engage the wet clutch 6, so that the engine 1 is engaged to the input shaft 4. The order of engagement between them is executed as follows. First, the synchronous sleeve 31b is engaged with the spline 11a to form a power transmitting condition in the transmission gear train of the first speed range, and thereafter the wet clutch 6 is operated to be engaged. Thereby, the power of the engine 1 is transmitted to the input shaft 4 via the wet clutch 6 to travel the motor vehicle.

As a depressing amount of an accelerator pedal increases, the electronic control throttle valve 2 is operated to open, and a vehicle speed increases, so that an up-shifting transmission operation is executed. To the contrary, a downshifting transmission operation is executed as the vehicle speed decreases or when operating a kick down by deeply depressing the accelerator pedal. During the up-shifting or down-shifting operation, the wet clutch 6 is disengaged, and the engine speed is lowered by turning the throttle valve down. For example, when the up-shifting operation from the first speed range to the second speed range is executed, firstly the wet clutch 6 is disengaged, next an engaging object of the synchronous sleeve 31b is moved from the spline 11a to the spline 12a of the second speed drive gear 12, and thereafter the wet clutch 6 is engaged again. On the other hand, when the down-shifting operation from the second speed range to the first speed range is executed, firstly the wet clutch 6 is disengaged, next an engaging object of the synchronous sleeve 31b is moved from the spline 12a to the spline 11a, and thereafter the wet clutch 6 is engaged again. The up-shifting and down-shifting transmission operations to the other transmission gear range also are executed with the same way as mentioned above. In addition, the transmission operation is automatically executed in accordance with a program of transmission patterns prestored stored in the control unit 41.

On the other hand, there occurs a drag torque due to the fluid friction of the ATF between the drive side clutch disc 7a and the driven side clutch disc 8a since the ATF is filled within the wet clutch 6 as mentioned above. Thus, the rotational speed Nm of the input shaft 4 varies along with a variation of the rotational speed of the crank shaft 3 due to the drag torque even if the wet clutch 6 is disengaged. In this case, when the engine speed is lowered through turning the throttle valve largely down during the transmission operation, the engine speed becomes lower than the rotational speed of the input shaft 4. When the engine speed is lowered, the transmission operation can be smoothly executed in the up-shifting operation since the difference of rotational speed to be adjusted for the up-shifting operation is allowed to be smaller by the drag torque, but a load applied to the synchromesh mechanism becomes excessive in the down-shifting operation since the difference of rotational speed to be adjusted for the down-shifting operation is conversely allowed to be larger by the drag torque.

Then, the automated manual transmission of the present invention controls the engine speed Ne to heighten by a compensating value a than the rotational speed Nm of the input shaft 4, so that the rotational speed Nm of the input shaft 4 can be raised until the rotational speed necessary for synchronizing the rotation by the synchromesh mechanism.

FIG. 2A is a flowchart showing a control process for performing a shift change from the second gear range to the first gear range in the automated manual transmission as shown in FIG. 1, and FIG. 2B is a flowchart showing a sub-routine of an ETC control in FIG. 2A. FIG. 3 shows time charts, wherein (A1)–(A4) are time charts showing some control conditions when performing a shift change from the second gear range to the first gear range in the automated manual transmission as shown in FIG. 1, and also (B1)–(B4), which has no ETC(Electronic Throttle Control) unit, are shown as a comparing example of (A1)–(A4).

Hereinafter, a control process for down-shifting transmission operation from the first speed range to the second speed range will be explained with reference to the flowcharts of FIGS. 2A and 2B. When it is determined to be necessary to shift down in the case that the vehicle speed is lowered, or the kick down operation is performed by deeply depressing the accelerator pedal, a shift instruction from the second speed range to the first speed range is issued by the control unit 41 at a step S1. When the shift instruction is issued, the wet clutch 6 is controlled to disengage the crank shaft 3 from the input shaft 4 at a step S2 as shown in (A3) of FIG. 3.

Next, at a step S3, a shift change operation for switching an engagement with the synchronous sleeve 31b from the spline 12a to the spline 11a is started as shown in (A4) of FIG. 3. When the synchronous sleeve 31b moves and reaches a position of neutral, a power transmission is not performed between the input shaft 4 and output shaft 5. Thus, the rotational speed Nm of the input shaft 4 varies along with the rotational speed of the crank shaft 3 due to the drag torque of the wet clutch 6.

During a switch operation of the synchronous sleeve 31b, the ETC control is executed at a step S4. The ETC control represents a control of the electronic control throttle valve 2 which is performed according to the detected driving condition based on a map preset in advance without relation to depressing amount of the accelerator pedal. As shown in FIG. 2B, when the ETC control is performed at a step S5, signals from the engine speed sensor 42, the input shaft rotational speed sensor 43, and the ATF oil temperature sensor 44 are read out, in which the engine speed Ne, the input shaft rotational speed Nm, and the ATF oil temperature are detected.

Figure 4:
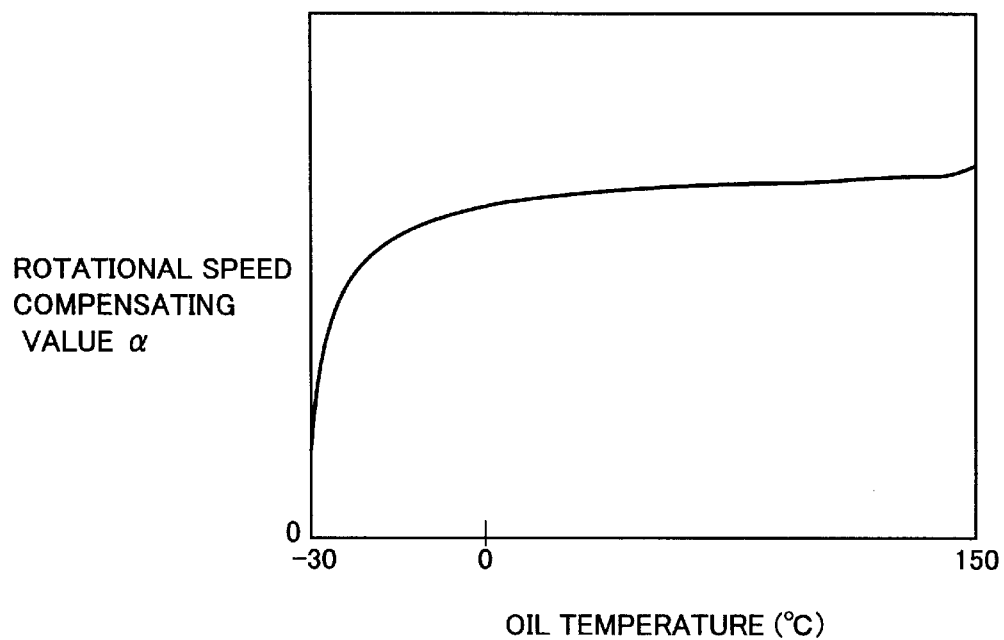
FIG. 4 is a characteristic view showing a relationship between an ATF(Automatic Transmission Fluid) oil temperature and a rotational speed compensating value in the vehicular automated manual transmission of FIG. 1.

FIG. 4 is a characteristic view showing a relationship between the ATF oil temperature and the rotational speed compensating value α in the automated manual transmission of FIG. 1. At a step S6, a predetermined compensating value α of the rotational speed is set by the ATF oil temperature detected at the step S5. A viscosity of the ATF has a characteristic that it is small in a high temperature area of the lubricating oil, and becomes larger as the oil temperature becomes lower. As a result, as the oil temperature becomes lower, the fluid friction becomes inversely large, so that the drag torque in the wet clutch also increases. Therefore, the compensating value α of the rotational speed is set small as the oil temperature of the lubricating oil filled in the wet clutch becomes low. At a step S6, the predetermined compensating value α of the rotational speed is set to a value corresponding with the oil temperature in order to suitably maintain the rotational speed of the input shaft 4, in which the rotational synchronizing by means of the synchromesh mechanism 31 is smoothly performed without influence from a variation of oil temperature.

At a step S7, the engine speed Ne is compared with a value adding the rotational speed compensating value α to the rotational speed Nm of the input shaft 4. When the engine speed Ne is more than the added value of the rotational speed Nm of the input shaft 4 and the compensating value α at the step S7, an opening degree Th of the electronic control throttle valve 2 is turned down by a compensating value β at a step S8, so that the engine speed Ne is lowered. To the contrary, when the engine speed Ne is less than the added value of the rotational speed Nm of the input shaft 4 and the compensating value α at the step S7, the opening degree Th of the electronic control throttle valve 2 is turned up by the compensating value β, so that the engine speed Ne is increased. That is, the opening degree of the electronic control throttle valve 2 is adjusted during the transmission operation as shown in (A2) of FIG. 3, in which the engine speed Ne is controlled to be raised by the compensating value α from the rotational speed Nm of the input shaft 4 as shown in (A1) of FIG. 3.

At a step S10, if the shift change is determined to be completed, the wet clutch 6 is engaged at a step S11. Thereby, the operation of down-shifting terminates.

As shown in (B1)–(B4) of FIG. 3, which shows a comparing example with (A1)–(A4), the drag torque of the wet clutch 6 works in such a manner that the rotational speed of the input shaft 4 is lowered when lowering the engine speed Ne to the input shaft rotational speed Nm through closing the throttle valve in the down-shifting operation without the ETC control. Thereby, the large load is applied to the synchromesh mechanism by the drag torque, in which time for down-shifting is extended. On the other hand, in the automated manual transmission of the present invention, the difference between the rotational speed of the input shaft 4 and the engine 1 becomes small as shown in (A1) of FIG. 3, so that the load applied to the synchromesh mechanism 31 is decreased. Thus, when the synchronous sleeve 31b is engaged with the spline 11a of the first speed range under such a condition, the shift change operation can be quickly performed.

It goes without saying that the present invention is not limited to the embodiment mentioned above, and can be variously modified without departing from the scope of the invention.

Figure 2:
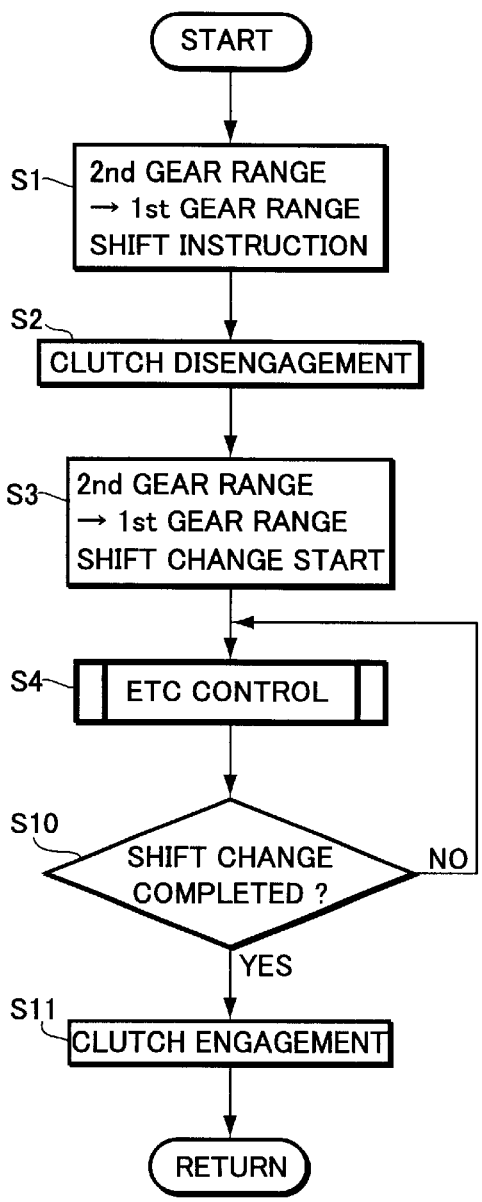
FIG. 2A is a flowchart showing a control process for performing a shift change from a second gear range to a first gear range in the transmission as shown in FIG. 1.
FIG. 2B is a flowchart showing a sub-routine of an ETC control in FIG. 2A.
Figure 2:
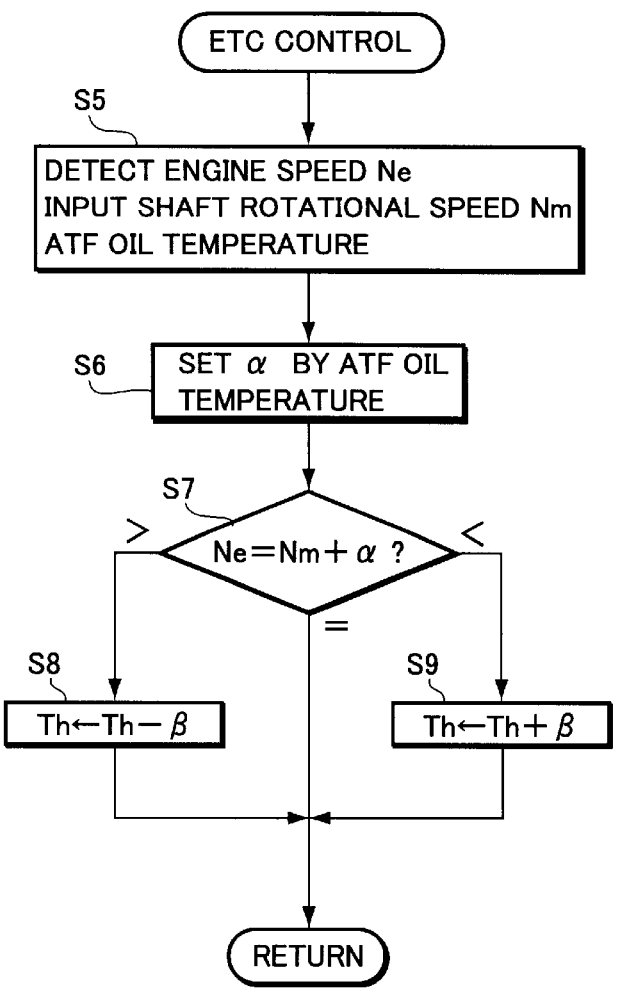
Figure 3:
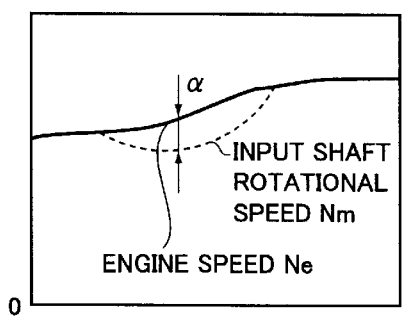
FIG. 3 shows time charts, wherein (A1)–(A4) are time charts showing some control conditions when performing a shift change from a second gear range to a first gear range in the transmission as shown in FIG. 1, and also (B1)–(B4), which has no ETC control, are shown as a comparing example of (A1)–(A4)
Figure 3:
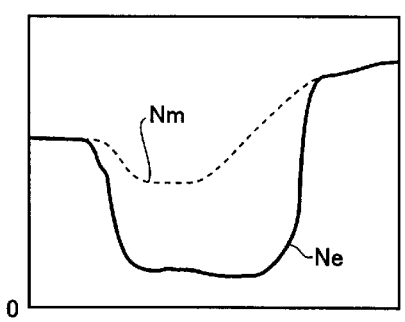
Figure 3:
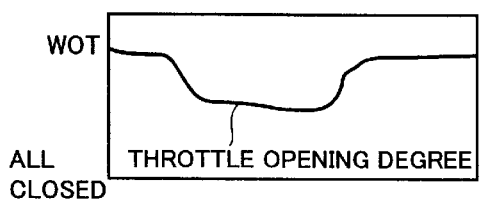
Figure 3:
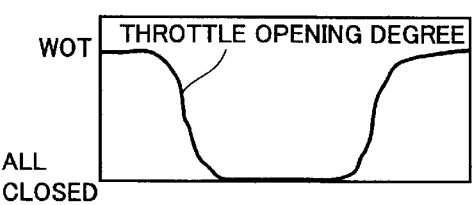
Figure 3:
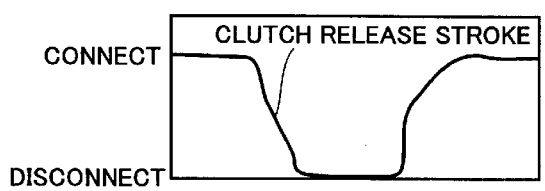
Figure 3:
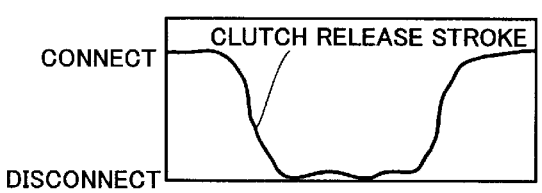
Figure 3:
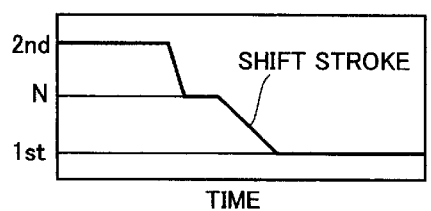
Figure 3:
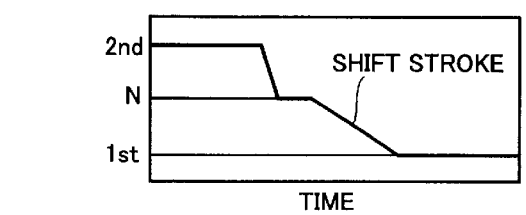

For example, FIG. 2 indicates the case of down-shifting from the second speed range to the first speed range, but the other cases of down-shifting such as one from the third speed range to the second speed range can be also controlled in the same manner. Further, the automated manual transmission may be provided with a torque converter, in which the wet clutch 6 may be assembled in the torque converter. In addition, as the switching mechanism of the transmission gear train, the synchromesh mechanisms 31 to 33 are used, but a dog clutch switching mechanism may be employed.

In the case of the illustrated embodiment, the number of the gear change stages is set to the forward moving five stages, but the number of the gear change stages may be set to an optional number. Further, the present invention may be applied to a power transmitting apparatus having an auxiliary transmission. Further, the automated manual transmission of the present invention is applied to a two wheels driving vehicle in the above description, but may be applied to a four wheels driving vehicle. In addition, the illustrated transmission is of the longitudinal-placed type in which the input shaft and the output shaft are directed in a forward and backward direction of the vehicle, but the present invention may be also applied to a horizontal-placed type in which the input shaft and the output shaft are directed in a vehicle width direction.

According to the present invention, the engine speed is set higher by the predetermined value than the input shaft rotational speed, in which the drag torque of the wet clutch works in such a manner that the rotation of the input shaft is increased. Thereby, the difference of the rotational speed between the input shaft and output shaft becomes small, so that the transmission operation of down-shifting can be quickly executed. In addition, it is possible to reduce the degree of shock which occurs when the wet clutch is engaged again after terminating the down-shifting operation. In short, the transmission characteristic of the vehicular automated manual transmission with the wet multi-disc type clutch can be improved.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control apparatus of a vehicular automated manual transmission having an input shaft provided with a plurality of drive gears, an output shaft provided with a plurality of driven gears engaging with the drive gears, and an actuator for switching a transmission gear trains transmitting a power from the input shaft to the output shaft, comprising:

an electronic control throttle valve for adjusting an engine speed;

a wet clutch for engaging/disengaging an engine with the input shaft, the wet clutch being provided between the engine and the input shaft; and control means for setting the engine speed higher by a predetermined value than a rotational speed of the input shaft through allowing the electronic control throttle valve to open when down-shifting the transmission gear trains by the actuator.

2. The control apparatus of a vehicular automated manual transmission according to claim 1, wherein the control means adjusts an opening degree of the throttle valve based on signals detected from an engine speed sensor, an input shaft rotational speed sensor, and a lubricating oil temperature sensor.

3. The control apparatus of a vehicular automated manual transmission according to claim 1, wherein the predetermined value is set small as an oil temperature of a lubricating oil filled in the wet clutch becomes low.

* * * * *